(12) United States Patent
Scholz et al.

(10) Patent No.: US 7,926,302 B2
(45) Date of Patent: Apr. 19, 2011

(54) METHOD AND APPARATUS FOR MANUFACTURING A GLASS BODY

(75) Inventors: Katrin Scholz, Bobritzsch (DE); Stefan Auras, Mittweida (DE); Sven Haertig, Frankenhain (DE); Jens Voigtlaender, Waldheim (DE)

(73) Assignee: Endress + Hauser Conducta Gesellschaft für Mess- und Regeltechnik mbH + Co. KG, Gerlingen (DE)

( * ) Notice: Subject to any disclaimer, the term of this patent is extended or adjusted under 35 U.S.C. 154(b) by 1016 days.

(21) Appl. No.: 10/581,666

(22) PCT Filed: Nov. 29, 2004

(86) PCT No.: PCT/EP2004/053153
§ 371 (c)(1), (2), (4) Date: May 7, 2007

(87) PCT Pub. No.: WO2005/054141
PCT Pub. Date: Jun. 16, 2005

(65) Prior Publication Data
US 2007/0271960 A1    Nov. 29, 2007

(30) Foreign Application Priority Data
Dec. 5, 2003 (DE) .................. 103 57 335

(51) Int. Cl.
*C03B 23/04* (2006.01)
*C03B 23/057* (2006.01)
*C03B 23/11* (2006.01)

(52) U.S. Cl. .................. 65/54; 65/36; 65/42; 65/56

(58) Field of Classification Search .................. 65/36, 56, 65/42, 54; 204/416–420
See application file for complete search history.

(56) References Cited

U.S. PATENT DOCUMENTS

| | | | | |
|---|---|---|---|---|
| 2,119,009 A | * | 5/1938 | Elias | 138/148 |
| 2,755,243 A | * | 7/1956 | Beckman et al. | 204/420 |
| 3,211,640 A | * | 10/1965 | Leonard et al. | 204/420 |
| 3,226,313 A | * | 12/1965 | Riseman | 204/420 |

(Continued)

FOREIGN PATENT DOCUMENTS

DE    196 25 690 A1    1/1998

(Continued)

*Primary Examiner* — Jason L. Lazorcik
(74) *Attorney, Agent, or Firm* — Bacon & Thomas, PLLC

(57) ABSTRACT

A method for manufacturing a glass body for a potentiometric sensor, including: loading a first spindle of a glass lathe with outer and inner glass tubes, so that the glass tubes are arranged coaxially with one another and with the axis of rotation of the first spindle, the inner glass tube and the outer glass tube each has a media-side end, and the two media-side ends have defined axial positions relative to one another; loading a second spindle with an auxiliary glass tube, so that the axis of rotation of the second spindle is arranged coaxially with the axis of rotation of the first spindle; moving the auxiliary glass tube to be contiguous with the outer glass tube; fusion joining of the outer glass tube with the auxiliary glass tube; producing a connection between the outer glass tube, or the auxiliary glass tube, and the inner glass tube; removing a remainder of the auxiliary glass tube; producing a media-side opening of the inner glass tube; and forming a media-side edge of the opening. Optionally, the method includes, additionally, the automatic blowing of a glass membrane on the media-side edge.

9 Claims, 1 Drawing Sheet

U.S. PATENT DOCUMENTS

| | | | | |
|---|---|---|---|---|
| 3,282,817 A | * | 11/1966 | Riseman et al. | 204/420 |
| 3,306,837 A | * | 2/1967 | Riseman et al. | 204/420 |
| 3,341,443 A | * | 9/1967 | Leonard | 204/420 |
| 3,423,304 A | * | 1/1969 | Leonard | 204/435 |
| 3,444,068 A | * | 5/1969 | Leonard et al. | 204/420 |
| 3,458,422 A | * | 7/1969 | Proctor, Jr. | 204/420 |
| 3,539,919 A | * | 11/1970 | Hogg | 324/71.1 |
| 3,555,068 A | | 1/1971 | Leonard | |
| 3,855,095 A | * | 12/1974 | Leonard et al. | 204/420 |
| 4,661,236 A | * | 4/1987 | Gelo et al. | 204/420 |
| 4,687,500 A | * | 8/1987 | Gelo et al. | 65/36 |
| 4,834,066 A | | 5/1989 | Collins | |
| 5,158,589 A | | 10/1992 | Curtis | |
| 6,068,745 A | * | 5/2000 | Zeidler | 204/420 |
| 6,536,239 B1 | | 3/2003 | Mueller | |
| 6,568,218 B1 | | 5/2003 | Mueller | |

FOREIGN PATENT DOCUMENTS

| | | |
|---|---|---|
| DE | 101 16 075 C1 | 5/2002 |
| DE | 101 16 099 A1 | 10/2002 |
| EP | 1 302 448 A2 | 4/2003 |

\* cited by examiner

METHOD AND APPARATUS FOR MANUFACTURING A GLASS BODY

FIELD OF THE INVENTION

The invention relates to a method for manufacturing a glass body, especially a glass body of an electrochemical sensor, for example a pH-sensor or another ion-sensitive sensor.

BACKGROUND OF THE INVENTION

A pH-sensor for registering the pH-value of a medium ordinarily comprises two coaxial glass tubes, with the outer glass tube being connected with the inner glass tube at the media-contacting end, so that the media-side opening of the outer glass tube is sealed, and with the media-contacting end of the inner glass tube having an ion-sensitive glass membrane. In the media-contacting end section of the outer tube there is additionally provided at least one diaphragm, via which an electrolyte bridge is assured between a reference liquid in an outer chamber, which is formed between the inner glass tube and the outer glass tube, and a medium surrounding the sensor.

Manufacture of the glass body involves much manual work and is very complex. The assignee has automated a method for manufacturing the inner glass tube having an ion-sensitive, glass membrane blown thereon, as described in German Patent No. DE 10 116 075.5 and Offenlegungsschrift No. DE 10 116 099. Inner tubes manufactured in such manner are combined with an outer glass tube into a so-called single-rod, measuring chain by inserting a drilled-through, porous plug of PTFE into the media-side end of the outer glass tube and by inserting the inner glass tube into the drilled bore of the porous stopper. There is, in contrast, still no automatic fabricating process for the glass body of a single-rod measuring chain, including the ion-sensitive membrane with a glass connection between the inner glass tube and the outer glass tube. The reasons therefor are two-fold. First, a subsequent fusion joining of the end region of an outer glass tube with the end region of an inner glass tube, when the inner glass tube already has been equipped with an ion-sensitive membrane, would endanger the ion-sensitive membrane. Second, it has not yet been possible to connect the outer glass tube with the inner glass tube in such a manner that, on the edge of the remaining opening of the inner glass tube, an ion-sensitive glass membrane can be blown using an automatic process according to the above-referenced intellectual property.

SUMMARY OF THE INVENTION

It is, therefore, an object of the present invention to provide a method for the automatic manufacture of a glass body for a single-rod, measuring chain.

The method of the invention for manufacture of a glass body for a potentiometric sensor includes the steps of:

Loading a first spindle of a glass lathe with an outer glass tube and an inner glass tube, with the outer glass tube and the inner glass tube being arranged coaxially with one another and with an axis of rotation of the first spindle of the glass lathe, the inner glass tube and the outer glass tube having, in each case, a media-side end, and the two media-side ends being positioned in defined axial positions relative to one another; loading a second spindle with an auxiliary glass tube, with the axis of rotation of the second spindle being arranged coaxially with the axis of rotation of the first spindle; moving the auxiliary glass tube to be contiguous to the outer glass tube; fusion joining the outer glass tube with the auxiliary glass tube; producing a connection between the outer glass tube, or the auxiliary glass tube, and the inner glass tube; removing a remainder of the auxiliary glass tube; producing a media-side opening of the inner glass tube; and forming a media-side edge of the opening. Optionally, the method further comprises the automatic blowing of a glass membrane on the media-side edge.

The described steps are preferably all performed automatically.

For performing the method of the invention, an apparatus is provided comprising a glass lathe and at least one electronic data processing system. The electronic data processing system communicates with a plurality of sensors and controls.

The apparatus includes a camera for monitoring geometric parameters, such as the centering of the glass tubes, their axial positions, and registers at least the diameter of the outer glass tube. The camera is connected with the electronic data processing system, which performs a digital image processing.

The data processing system communicates with the controls of the drives of the first and second spindles. The spindles are caused to rotate in the same sense for the connecting of the auxiliary glass tube with the other tubes, with, moreover, an identical rpm being currently preferred for both spindles. The rpm of the spindles during working can amount to a few 100 rpm, for example 200 to 300 rpm.

Furthermore, the data processing system communicates with a control device for a burner. The control device controls, on the one hand, the gas mixture, with which the burner is fed, plus preferably an ignition device, as well as the position of the burner and its angle relative to the axis of the spindles. The temperature of the glass section to be worked is an essential criterion for the control of the burner; temperature is registered by means of a pyrometer, which likewise communicates with the central data processing system. The working temperature can be, for example, about 800° C. to 900° C.

A blowline, or pipeline supplying compressed gas, communicates with the inner and outer glass tubes via their media-far ends. Pressure in the blowline is preferably likewise controlled by means of the central data processing system.

The end of the auxiliary glass tube facing away from the outer glass tube and the inner glass tube is preferably pressure-tightly sealed during the process.

The apparatus includes, preferably, likewise, furthermore, an automatically positionable, tool carrier, which is, likewise, controlled from the central data processing system. The tool carrier can support a heat-resistant tool, which exhibits a ceramic material, or a carbon-fiber material, with the edge of the media-side opening being formable with the tool.

Preferably additionally provided are automatic manipulators, for example gripping devices, with which the glass tubes are removed from magazines, and the spindles are loaded. Additionally, the glass bodies are preferably removed from the glass lathe by means of an automatic manipulator, after the forming of the media-side opening, and directly, or via a magazine, transferred to an apparatus for the blowing of the membrane.

The method of the invention and the apparatus of the invention will now be explained on the basis of an example of an embodiment illustrated in the drawing, the sole FIGURE of which shows as follows:

DESCRIPTION OF THE PREFERRED EMBODIMENT

Figure 1:
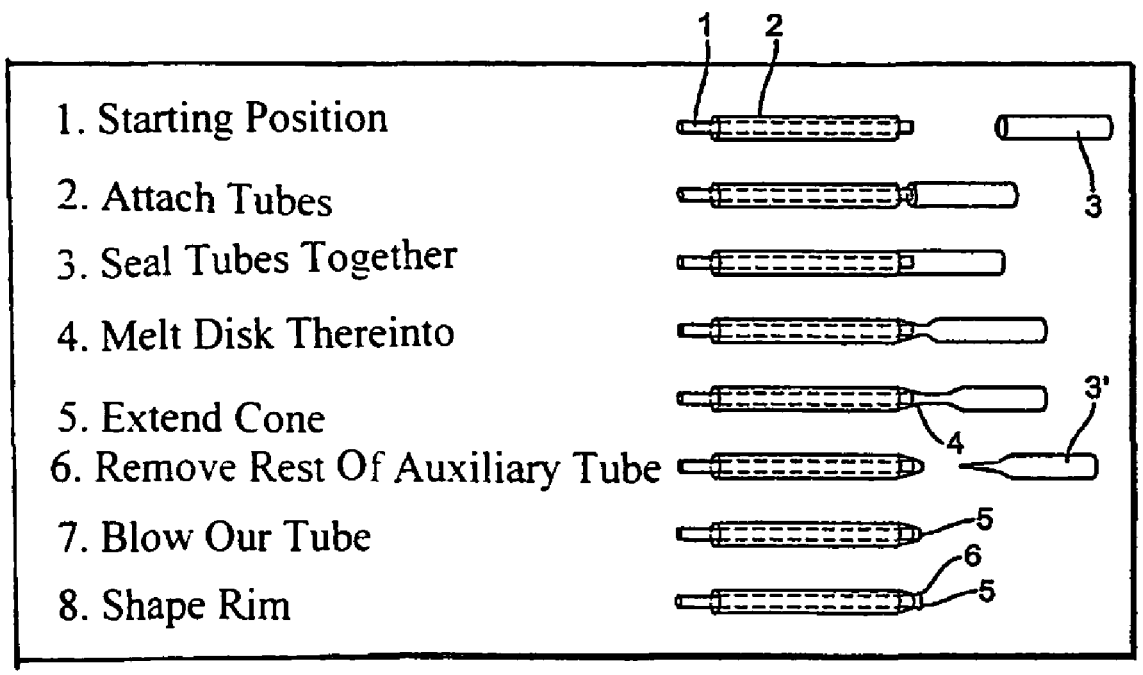
FIG. 1 A schematic, longitudinal section through a glass body during the various working stages in an embodiment of the method of the invention.

Respecting the illustrated embodiment of the method, the following is to be noted concerning the separate method steps. In the case of loading the first and second spindles with the glass tubes, preferably, in each case, a defined, axial stop is provided for the tubes, in order to set the axial positions of the tubes with respect to one another. The outer glass tube 2 and the inner glass tube 1 must additionally be centered with respect to the spindle axis of the first spindle. Monitoring of the centering is done by the camera, which is connected with the electronic data processing system, which performs a digital image processing. By means of the camera and the image processing, additionally the axial positions of the media-side tube ends of the inner and outer glass tubes are registered. Furthermore, the tube diameters are registered.

In the approaching of the auxiliary glass tube 3 to the outer glass tube 2, the auxiliary glass tube is preferably moved to a contiguous distance of about 1 mm from the outer glass tube. Then, the glass tubes are heated by means of the burner sufficiently that they can be fusion joined together.

For the fusion joining of the auxiliary glass tube with the outer glass tube, the auxiliary glass tube is moved into contact with the outer glass tube. As required, the joint of the glass tubes is even slightly axially upset and then subsequently stretched. The upsetting and stretching can, as required, also be repeated a plurality of times, for the purpose of achieving a homogeneous connection. For adjusting the diameter of the location of the connection, air pressure in the glass tubes can be controlled by means of air pressure in the blowline.

In a further development of the method, the outer glass tube has in its media-side end section at least one ceramic diaphragm, which can be, for example, at least partially melted into the media-side end face. For facilitating this melting-in, it is currently preferred that at least one section of a lateral surface of the ceramic membrane element has a coating of glass, with which the diaphragm can be melted-in on the end face. By the fusion joining of the auxiliary glass tube with the outer tube, the diaphragm is then integrated into the resulting outer tube of the glass body.

For producing a connection between the outer tube, composed of the outer glass tube and the auxiliary glass tube, and the inner glass tube, the outer tube is heated in a section and drawn in length in the direction of the auxiliary glass tube spindle, such that the diameter in the heated section decreases sufficiently that the section of the outer tube becomes connected, and fusion joined, with the media-side edge of the inner tube. For homogenizing the joint, upsets and stretching's around the desired end position are possible, with air pressure being adjustable by means of the blowline for controlling diameter.

In this embodiment, the inner glass tube has on its media-side end a dish-, or disk-, shaped, radial widening, which facilitates the connection to the outer tube.

In this embodiment of the method, a cone 4 is then formed, by heating a section of the outer tube axially spaced on the media-side from the joint between the inner glass tube and the outer glass tube, using a broad flame or a burner moving to cover the section, and then drawing the section axially in length.

For removing the remainder 3' of the auxiliary glass tube, an axially limited, separating section is heated with a narrow flame and drawn lengthwise, until the connection between the parts of the outer tube tears at the separating section.

To the extent that the media-side opening of the tube is closed following removal of the auxiliary glass tube, the tube must be blown out, in order to provide again the media-side opening 5. For this, the closed end region is heated in a limited, axial section.

For forming the edge 6 of the media-side opening, a heat-resistant tool is moved to the melted edge, with the tool providing a contour, in order to form the edge 6 of the opening.

While the intermediate steps following the initial positioning and centering of the tubes can occur either under camera supervision or else "blind" on the basis of a stored program, without control via image processing, it is currently preferred that, in the case of forming the edge, a monitoring and control of this precess-step is done on the basis of a camera monitoring. In this way, a constant quality of the edges can be achieved, this being required for the automatic blowing of the glass membranes.

Regarding details of the blowing of the glass membrane, reference is made to the disclosures of the above-cited intellectual property of the assignee. Basically, such is effected by placing the glass body, composed of the inner glass tube and the outer glass tube, with the media-side edge onto the surface of a glass melt; then the glass body is raised; left clinging to the media-side edge is a film of molten glass, which closes the media-side opening. Then, by means of a predetermined pressure curve, a glass membrane is blown from the film.

As required, the glass body is removed from the glass lathe following the forming of the media-side edge and before the blowing of the membrane, and an apparatus for the blowing of the membrane is then loaded with the glass body, so that the blowing of the membrane can proceed.

The invention claimed is:

1. A method for the automatic manufacture of a glass body for a potentiometric sensor, comprising the steps of:
    loading a first spindle of a glass lathe with an outer glass tube and an inner glass tube, so that the outer glass tube and the inner glass tube are arranged coaxially with one another and with an axis of rotation of the first spindle of the glass lathe, each of the inner glass tube and the outer glass tube has a media-side end, and the two media-side ends are positioned in defined axial positions relative to one another;
    loading a second spindle with an auxiliary glass tube, so that the axis of rotation of the second spindle is arranged coaxially with the axis of rotation of the first spindle;
    bringing the auxiliary glass tube into a contiguous relationship with the outer glass tube;
    fusion joining the outer glass tube with the auxiliary glass tube, in order to form a combined, outer tube;
    producing a connection between the outer tube, composed of the outer glass tube and the auxiliary glass tube, and the inner glass tube;
    after completion of the steps of fusion joining the outer glass tube with the auxiliary glass tube, in order to form a combined glass tube, and of producing a connection between the outer tube, composed of the outer glass tube and the auxiliary glass tube, and the inner glass tube removing a remainder of the auxiliary glass tube from the outer tube;
    producing a media-side opening of the inner glass tube; and
    forming a media-side edge of the media-side opening.

2. The method as claimed in claim 1, further comprising the step of:
    automatically blowing a glass membrane on said formed, media-side edge of the opening.

3. The method as claimed in claim 1, wherein:
the inner glass tube has a dish-, or disk-, like, radial widening on its media-side end.

4. The method as claimed in claim 1, further comprising the step of:
forming a cone at the media-side end of the outer tube, following the producing of a connection between the outer tube and the inner tube, and before the removing of the auxiliary glass remainder from the outer tube.

5. The method as claimed in claim 1, wherein:
said producing of the media-side opening includes a blowing-out of the inner glass tube.

6. The method as claimed in claim 1, wherein:
said forming of the edge of the media-side opening is effected by means of a tool, which has a ceramic or carbon-fiber material.

7. The method as claimed in claim 1, wherein:
said forming of the edge of the media-side opening is monitored and controlled by means of a camera and digital image processing.

8. The method as claimed in claim 1, wherein:
the outer glass tube has in its media-side, end section at least one ceramic diaphragm, which is at least partially melted into a media-side end face.

9. A method for automatic manufacture of a glass body for a potentiometric sensor, comprising the steps of:

loading a first spindle of a glass lathe with an outer glass tube and an inner glass tube, so that the outer glass tube and the inner glass tube are arranged coaxially with one another and with an axis of rotation of the first spindle of the glass lathe, each of the inner glass tube and the outer glass tube has a media-side end, and the two media-side ends are positioned in defined axial positions relative to one another;

loading a second spindle with an auxiliary glass tube, wherein the axis of rotation of the second spindle is arranged coaxially with the axis of rotation of the first spindle;

bringing the auxiliary glass tube into a contiguous relationship with the media-side end of the outer glass tube;

fusion joining the outer glass tube with the auxiliary glass tube at said media-side end of the outer glass tube, in order to form a combined, outer tube;

producing a connection between the outer tube, composed of the outer glass tube and the auxiliary glass tube, and the inner glass tube;

removing a remainder of the auxiliary glass tube from the outer tube;

producing a media-side opening of the inner glass tube; and forming a media-side edge of the opening.

\* \* \* \* \*